US007401114B1

(12) United States Patent
Block et al.

(10) Patent No.: US 7,401,114 B1
(45) Date of Patent: Jul. 15, 2008

(54) METHOD AND APPARATUS FOR MAKING A COMPUTATIONAL SERVICE HIGHLY AVAILABLE

(75) Inventors: Robert J. Block, Mountain View, CA (US); James G. Hanko, Redwood City, CA (US); J. Kent Peacock, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 779 days.

(21) Appl. No.: 09/513,015

(22) Filed: Feb. 25, 2000

Related U.S. Application Data

(63) Continuation-in-part of application No. 09/063,335, filed on Apr. 20, 1998, now Pat. No. 7,346,689.

(51) Int. Cl.
*G06F 15/16* (2006.01)
*G06F 12/00* (2006.01)
(52) U.S. Cl. .................................. 709/203; 709/219
(58) Field of Classification Search ................. 709/225, 709/227, 229, 220, 228, 249, 200–203, 217–219; 379/221.03, 221.04, 221.05, 112.02, 279; 713/200, 201, 172, 182; 370/254; 340/825, 340/5.8, 5.86; 380/23, 239; 455/8; 700/21, 700/82, 79; 714/1–57; 705/65–67
See application file for complete search history.

(56) References Cited

U.S. PATENT DOCUMENTS

| 5,491,752 | A | * | 2/1996 | Kaufman et al. | ............... 380/30 |
|---|---|---|---|---|---|
| 5,590,199 | A | * | 12/1996 | Krajewski et al. | ........... 713/159 |
| 5,602,918 | A | * | 2/1997 | Chen et al. | .................. 713/153 |
| 5,633,999 | A | * | 5/1997 | Clowes et al. | .................. 714/6 |
| 5,796,999 | A | * | 8/1998 | Azagury et al. | ............... 707/10 |
| 5,828,847 | A | * | 10/1998 | Gehr et al. | ................... 709/239 |
| 5,835,724 | A | * | 11/1998 | Smith | ......................... 709/227 |
| 5,870,546 | A | * | 2/1999 | Kirsch | ........................ 709/205 |

(Continued)

FOREIGN PATENT DOCUMENTS

EP        WO 97/15885      *    5/1997

(Continued)

OTHER PUBLICATIONS

About clustering technology in WebLogic BEA WebLogic Server 4.5, Aug. 1999, pp. 1-7.*

(Continued)

*Primary Examiner*—Zarni Maung
(74) *Attorney, Agent, or Firm*—Martine Penilla & Gencarella, LLP

(57) ABSTRACT

The present invention provides a method and apparatus for making a computational service highly available in a multiple server computer environment. In the thin client computing paradigm, end user terminals rely on remote server computers for operation of most functions traditionally associated with personal computing. If the remote server computer fails, all of the users' computers will likewise fail. The present invention provides a solution by implementing a redundant server strategy and a redirection process. One or more servers hosting a communication to the terminal do not contain the only copy of permanent user data. This makes all session hosting servers interchangeable. If a server fails, the failure is detected and the terminal switches to another host server.

19 Claims, 11 Drawing Sheets

U.S. PATENT DOCUMENTS

| | | | | |
|---|---|---|---|---|
| 5,875,306 | A | * | 2/1999 | Bereiter .................. 709/220 |
| 5,938,732 | A | * | 8/1999 | Lim et al. ................ 709/229 |
| 5,951,694 | A | * | 9/1999 | Choquier et al. .......... 714/15 |
| 5,987,621 | A | * | 11/1999 | Duso et al. ................ 714/4 |
| 6,018,805 | A | * | 1/2000 | Ma et al. .................. 714/4 |
| 6,023,762 | A | * | 2/2000 | Dean et al. ............... 713/193 |
| 6,070,191 | A | * | 5/2000 | Narendran et al. ........ 709/226 |
| 6,195,680 | B1 | * | 2/2001 | Goldszmidt et al. ....... 709/203 |
| 6,199,110 | B1 | * | 3/2001 | Rizvi et al. ............... 709/227 |
| 6,226,744 | B1 | * | 5/2001 | Murphy et al. ............ 713/200 |
| 6,279,001 | B1 | * | 8/2001 | DeBettencourt et al. ... 707/10 |
| 6,381,650 | B1 | * | 4/2002 | Peacock ................... 709/245 |
| 2002/0120763 | A1 | * | 8/2002 | Miloushev et al. ........ 709/230 |
| 2003/0037160 | A1 | * | 2/2003 | Wall et al. ................ 709/233 |

FOREIGN PATENT DOCUMENTS

| EP | WO 01/63402 A2 | * | 8/2001 |
|---|---|---|---|

OTHER PUBLICATIONS

Host Configuration and Robustness in the Internet Protocol version 6, Lesiuk, B.C., Aug. 1998, pp. 1-18.*

Network Working Group, Request for Comments (Draft): DHCP Safe Failover Protocol, Kinnear, K., Sep. 1998, pp. 1-29.*

Network Working Group, Request for Comments (1541/1531): Dynamic Host Configuration Protocol, Droms, R., Oct. 1993, pp. 1-39.*

SWEB: Towards a scalable WWW Server on Multicomputers, Andresen, et. al., Dept. Comp. Science, Univ. of California, 1996, pp. 1-7.*

LDD Today, Lotus Domino Advanced Services High Availability, Smelser, C., Jan. 1997, pp. 1-5.*

The Design and Architecture of the Microsoft Cluster Service, A Practical Approach to High-Availability and Scalability, Vogels, et. al., Proceedings of FTCS'98, Jun. 1998 in Munich, Germany, IEEE, pp. 1-10.*

Microsoft Windows NT, Server Cluster Strategy, High Availability and Scalability with Industry-Standard Hardwar, Business Systems Div., 1995, pp. 1-9.*

High Availability and Scalability with Domino Clustering and Partioning an AIX, by Barrios, Conradsen, Haramoto & Marin, International Technical Support Organization, http://www.redbooks.ibm.com, SG24-5163-00, pp. 1-182.*

* cited by examiner

METHOD AND APPARATUS FOR MAKING A COMPUTATIONAL SERVICE HIGHLY AVAILABLE

RELATED APPLICATION DATA

This patent application is a continuation-in-part of U.S. patent application Ser. No. 09/063,335, filed on Apr. 20, 1998, entitled "Method and Apparatus for Providing a Virtual Desktop System Architecture," now U.S. Pat. No. 7,346,689.

BACKGROUND OF THE INVENTION

1. Field of the Invention

This invention relates to the field of networked computer systems.

2. Background Art

Computer users continue to desire high performance computing experiences in ever-changing computer environments. The computing paradigm is shifting. New architectures are emerging which require new solutions to deal with the need for a high performance computing experience. One such architecture is that of the thin-client computing system.

In the thin-client architecture, the functionality of the end user computer is reduced to the point that, for the most part, only input and output capabilities exist. The end user computer is connected over a high bandwidth computer network to a more powerful server computer that performs all the functions traditionally associated with the personal computer, such as executing computer programs and processing data.

An individual end user computer can be turned on and off, and the user loses no state (e.g., the services running on their behalf continue to run on the server computer). In this type of architecture, a large number of end users can connect to a limited number of servers in this manner wherein multiple end users may be executing one or more computer processes on the same server. An inherent problem in this architecture is the danger that if the central server computer goes down, (during a power failure, for example), all of the end user terminals connected to it lose all of their state. Thus, the terminals are useless until the central computer is available again.

The evolution that led to this problem is better understood by reviewing the development of network computing. The idea is that network computers will access data and applications through a computer network, such as the internet, intranet, local area network, or wide area network. Only those applications that are needed for a particular task will be provided to the network computer. When the applications are no longer being used, they are not stored on the network computer.

Recently, a new computer system architecture referred to as the virtual desktop architecture has emerged. This system provides for a re-partitioning of functionality between a central server installation and the user hardware. Data and computational functionality are provided by data sources via a centralized processing arrangement. At the user end, all functionality is substantially eliminated except that which generates output to the user (e.g. display and speakers), takes input from the user (e.g. mouse and keyboard) or other peripherals that the user may interact with (e.g. scanners, cameras, removable storage, etc.)

All computing is done by one or more servers acting as central data sources and the computation is done independently of the destination of the data being generated. The output of a data source is provided to a terminal, referred to herein as a "Desktop Unit" (DTU). The DTU is capable of receiving the data and displaying the data.

The virtual desktop system architecture may be likened to other highly partitioned systems. For example, a public telephone company maintains powerful and sophisticated processing power and large databases at central offices. However, the DTU, (e.g., the telephone), is relatively simple and does not require upgrading when new features or services are added by the telephone company. The telephone itself becomes an appliance of low cost and extremely low obsolescence. Similarly, the display monitor of most computer systems has low obsolescence, and is typically retained through most desktop system upgrades.

The provision of services in the virtual desktop system architecture revolves around an abstraction referred to herein as a "session." A session is a representation of those services that are executing on behalf of a user at any point in time. The session abstraction is maintained by facilities known as the authentication and session managers, whose duty it is to maintain the database of mappings between tokens (i.e., unique identifiers bound to smart cards or other authentication mechanisms) and sessions, and to manage the services which make up each session.

For each user that the system is aware of there are one or more sessions. The session manager offers a service to the user that allows sessions to be configured and new sessions to be created. Many sessions routinely execute on each server. Since the central server computers traditionally maintain all of the state for this potentially vast pool of connected DTUs, if one of those central server computers goes down, the DTUs are useless until the central computer is available again. Thus, the central server is a single point of failure for a potentially large pool of users. If a high performance computing experience is to be provided in this evolving computer architecture, clearly a solution needs to address the single point of failure problem.

SUMMARY OF THE INVENTION

The present invention provides a method and apparatus for making a computational service highly available in a multiple server computer environment. In the thin-client computing paradigm, end user DTUs rely on remote server computers for operation of most functions traditionally associated with personal computing. These traditional functions include running computer programs and processing data. Since many users may be connected to one of the central server computers, if this central server computer fails, all of the users' DTUs will likewise fail.

The present invention provides a solution by implementing server redundancy and DTU redirection to maintain the availability of computing resources in a server failure situation. When the user connects over a DTU to a server, the user may begin to interact with their session (e.g., input may pass from the DTU to the server, and output may pass from the server to the DTU for user display). This user interaction may require permanently stored data to fulfill the user's attempted interactions (e.g., the session hosting server will need access to files, databases, mail servers, home directories, or calendars, for instance).

The server hosting the active session does not contain the sole copy of this permanent user data. That data is stored on another server. A redundant server storing the permanent user data is in communication with the session hosting server and has more stringent availability requirements, but provides this data to the hosting server as required. Since the architecture allows for the server hosting the session to lack permanent user state (e.g., data stored more or less permanently), all session hosting servers in the architecture become effectively interchangeable.

If a server fails, the failure is detected and the invention switches the DTUs using that server to another server. In one embodiment, the user is allowed to invoke multiple sessions on different servers in the group. Mechanisms are provided to switch among those sessions. In one embodiment, the invention uses a protocol having a self-discovery mechanism within a "failover group" (e.g., the set of servers that a set of DTUs can connect to).

Each server runs a group manager process. Each group manager process periodically broadcasts a message to all other servers on the network which provides information about the network configuration of the server. In addition, the group manager process periodically listens for messages from all other group manager processes in the network, which provide information about the network configuration of those servers. In this way, each server maintains a record of the network topology. With this topology, a server can determine to which other servers a given DTU can connect. This connection information is used when a DTU connects, or a token (e.g., a smart card) is applied to bind the user associated with the token, to select the appropriate server for that user.

The server selected for a user depends on whether that user has one or more existing sessions within the failover group. If there are existing sessions, the user is bound to the server with which they were last connected. If there are no existing sessions, a server is selected using a load balancing mechanism that attempts to find the most lightly-loaded server. The DTU is redirected to the selected server, which creates a new session for the user.

DETAILED DESCRIPTION OF THE INVENTION

Figure 1:
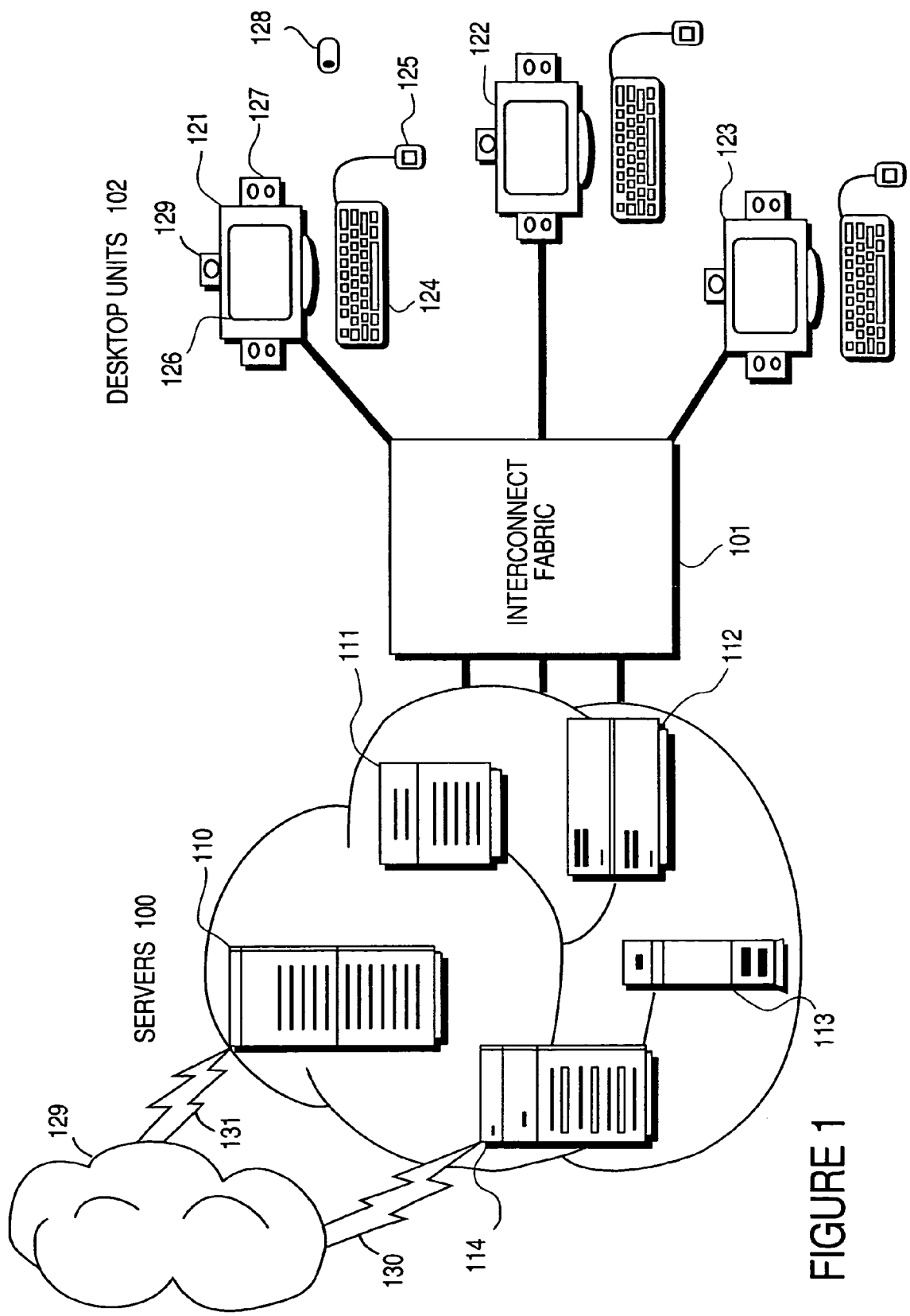
FIG. 1 illustrates the virtual desktop system architecture of the present invention.

In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

One or more embodiments of the invention may implement the load distribution mechanisms described in U.S. patent application Ser. No. 09/513,655, filed on Feb. 25, 2000, entitled "Method and Apparatus for Distributing Load in a Computer Environment", and assigned to the present assignee, the specification of which is herein incorporated by reference.

One or more embodiments of the invention may also implement the mechanisms for improved resource utilization described in U.S. patent application Ser. No. 09/513,652, filed on Feb. 25, 2000, entitled "Method and Apparatus for Improving Utilization of a Resource on a Shared Client", and assigned to the present assignee, the specification of which is incorporated herein by reference.

The present invention provides a method and apparatus for making computational services highly available in a multiple server computer environment. The invention implements server redundancy and DTU redirection to maintain near continuous access to computing resources in a server failure situation. When the user connects over a DTU to a server, the user may begin to interact with their session (e.g., input may pass from the DTU to the server, and output may pass from the server to the DTU for user display). To fulfill the user's attempts to interact, the server may require permanent data and need to access file systems, mail servers, or databases, for instance.

Permanent user data may be stored, for example, in one or more data servers that are in communication with the session hosting server, or stored in a manner such that the data can be recovered in the event of server failure. The server(s) storing the permanent user data has more stringent availability requirements than those servers that may host a session. Since the architecture allows for the server hosting the session to lack permanent user state (e.g., data stored more or less permanently), all session hosting servers are effectively interchangeable.

If a session hosting server fails, the present invention detects the failure and switches the DTUs using that server to an alternate session hosting server. In one embodiment, the user is allowed to invoke multiple sessions on different servers in the group. This embodiment provides mechanisms to switch among those sessions. In one embodiment, the invention uses a protocol having a self-discovery mechanism, which allows the invention to maintain a list of servers (e.g., the failover group) to which a set of DTUs can connect.

Each server runs a group manager process. Each group manager process generates a packet from time to time and broadcasts the packet to the network. The packet contains a message. The message provides information about the network configurations of the server. In addition, the group manager process listens for similar broadcasted packets from all other group manager processes. In this way, each server communicates with all other servers in the group, so that each server has a global view of every server's network topology. This exchange of messages between servers allows a failover group of servers to be self-organizing. New servers may join a failover group through the exchange of these messages, with no a priori configuration.

With the information in the broadcasted packets, each group manager process records a complete network topology. When one server goes down, the group manager processes use their information to redirect the DTUs to available servers. The redundant store of permanent user data remains unaffected because it resides on a server outside the redirection process. The redirected server, also connected to the permanent data store residing elsewhere on another server, has access to the permanent data store as well. Hence, a failed server scenario, which in the prior art would cause loss of computational services to multiple users, is overcome through the use of a redundant server having a permanent data store and network redirection.

The above mechanisms will be discussed in further detail with reference to one or more system architectures. One such architecture is the virtual desktop system architecture described below.

Virtual Desktop System Architecture

In one embodiment, the present invention is implemented in the computer system architecture referred to as the virtual desktop system architecture. This material is described in co-pending U.S. patent application Ser. No. 09/063,335, filed Apr. 20, 1998, entitled "Method and Apparatus for Providing a Virtual Desktop System Architecture" and assigned to the present assignee, and incorporated herein by reference.

The virtual desktop system architecture provides for a re-partitioning of functionality between a central server installation and the user hardware. Data and computational functionality are provided by the servers via a centralized processing arrangement. At the user end, all functionality is eliminated except that which generates output to the user (e.g. display and speakers), takes input from the user (e.g. mouse and keyboard) or other peripherals that the user may interact with (e.g. scanners, cameras, removable storage, etc.).

Substantially all computing is done by the central servers and the computation is done independently of the destination of the data being generated. The output of the server is provided to the DTU. The DTU is capable of receiving the data and displaying the data. The functionality of the system is partitioned between a display and input device and servers. The display and input device is the DTU. The partitioning of this system is such that state and computation functions have been removed from the DTU and reside on servers. In one embodiment of the invention, one or more servers communicate with one or more DTUs through some interconnect fabric, such as a network.

An example of such a system is illustrated in FIG. 1. Referring to FIG. 1, the system consists of servers 100 communicating data through interconnect fabric 101 to DTUs 102. It should be noted, however, that high availability strategies are not limited to the virtual desktop system architecture. Embodiments of the present invention are implemented in conjunction with a general purpose computer, like that described in FIG. 2.

Embodiment of General-Purpose Computer Environment

Figure 2:
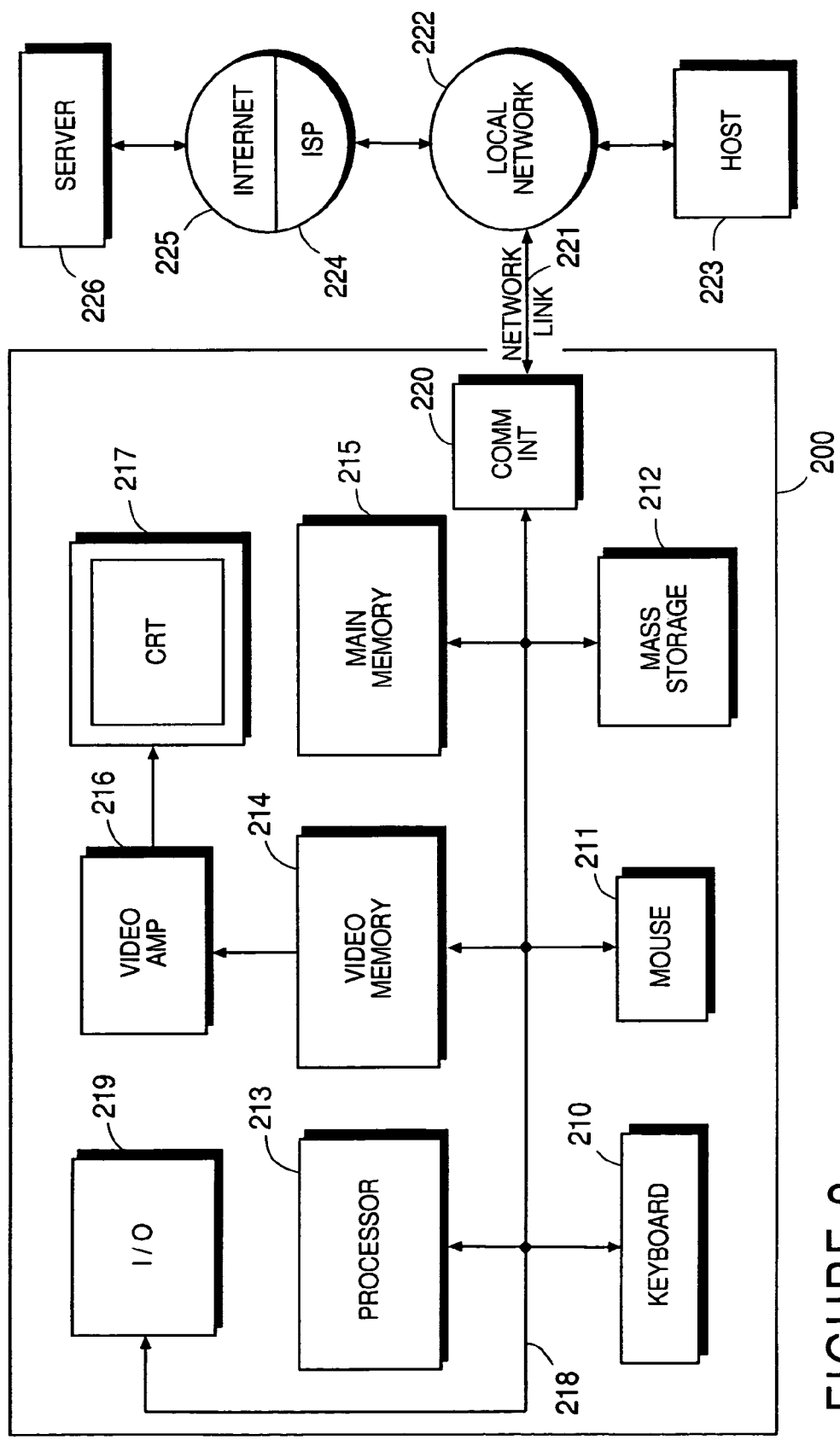
FIG. 2 is a block diagram of an example computer system that can be used with the present invention.

One embodiment of the invention can be implemented as computer software in the form of computer readable program code executed on a general purpose computer such as computer 200 illustrated in FIG. 2. A keyboard 210 and mouse 211 are coupled to a bi-directional system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a microprocessor manufactured by Motorola, such as the 680X0 processor or a microprocessor manufactured by Intel, such as the 80X86, or PENTIUM processor, or a SPARC microprocessor from Sun Microsystems. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220.

The received code may be executed by CPU 213 as it is received, and/or stored in mass storage 212, or other non-volatile storage for later execution. In this manner, computer 200 may obtain application code in the form of a carrier wave.

The computer systems described above are for purposes of example only. An embodiment of the invention may be implemented in any type of computer system or programming or processing environment.

Computational Service Providers

With reference to the virtual desktop system architecture, computational power and state maintenance is found in the service providers, or services. The services are not tied to a specific computer, but may be distributed over one or more traditional desktop systems such as described in connection with FIG. 2, or with traditional servers. One computer may have one or more services, or a service may be implemented by one or more computers. The service provides computation, state, and data to the DTUs and the service is under the control of a common authority or manager. In FIG. 1, the services are found on computers 110, 111, 112, 113, and 114. It is important to note that the central data source can also be providing data that comes from outside of the central data source 129, such as for example, the internet or world wide web 130. The data source could also be broadcast entities such as those that broadcast data such as television or radio signals 131. A service herein is a process that provides output data and responds to user requests and input.

It is the responsibility of the service to handle communications with the DTU that is currently being used to access the given service. This involves taking the output from the computational service and converting it to a standard protocol for the DTU. This data protocol conversion is handled in one embodiment of the invention by a middleware layer, such as the X11 server, the Microsoft Windows interface, a video format transcoder, the OpenGL interface, or a variant of the java.awt.graphics class within the service producer machine, although other embodiments are within the scope of the invention. The service machine handles the translation to and from the virtual desktop architecture wire protocol.

The service producing computer systems connect directly to the DTUs through the interconnect fabric. It is also possible for the service producer to be a proxy for another device providing the computational service, such as a database computer in a three tiered architecture, where the proxy computer might only generate queries and execute user interface code.

Interconnect Fabric

The interconnect fabric is any of multiple suitable communication paths for carrying data between the services and the DTUs. In one embodiment, the interconnect fabric is a local area network implemented as an Ethernet network. Any other local network may also be utilized. The invention also contemplates the use of wide area networks, the internet, the world wide web, an intranet, a local area network, and others. The interconnect fabric may be implemented with a physical medium such as a wire or fiber optic cable, or it may be implemented in a wireless environment.

Desktop Units

The DTU is the means by which users access the services. FIG. 1 illustrates DTUs 121, 122, and 123. A DTU may consist of a display 126, a keyboard 124, mouse 125, and audio speakers 127. The DTU includes the electronics needed to interface these devices to the interconnect fabric and to transmit to and receive data from the services.

Figure 3:
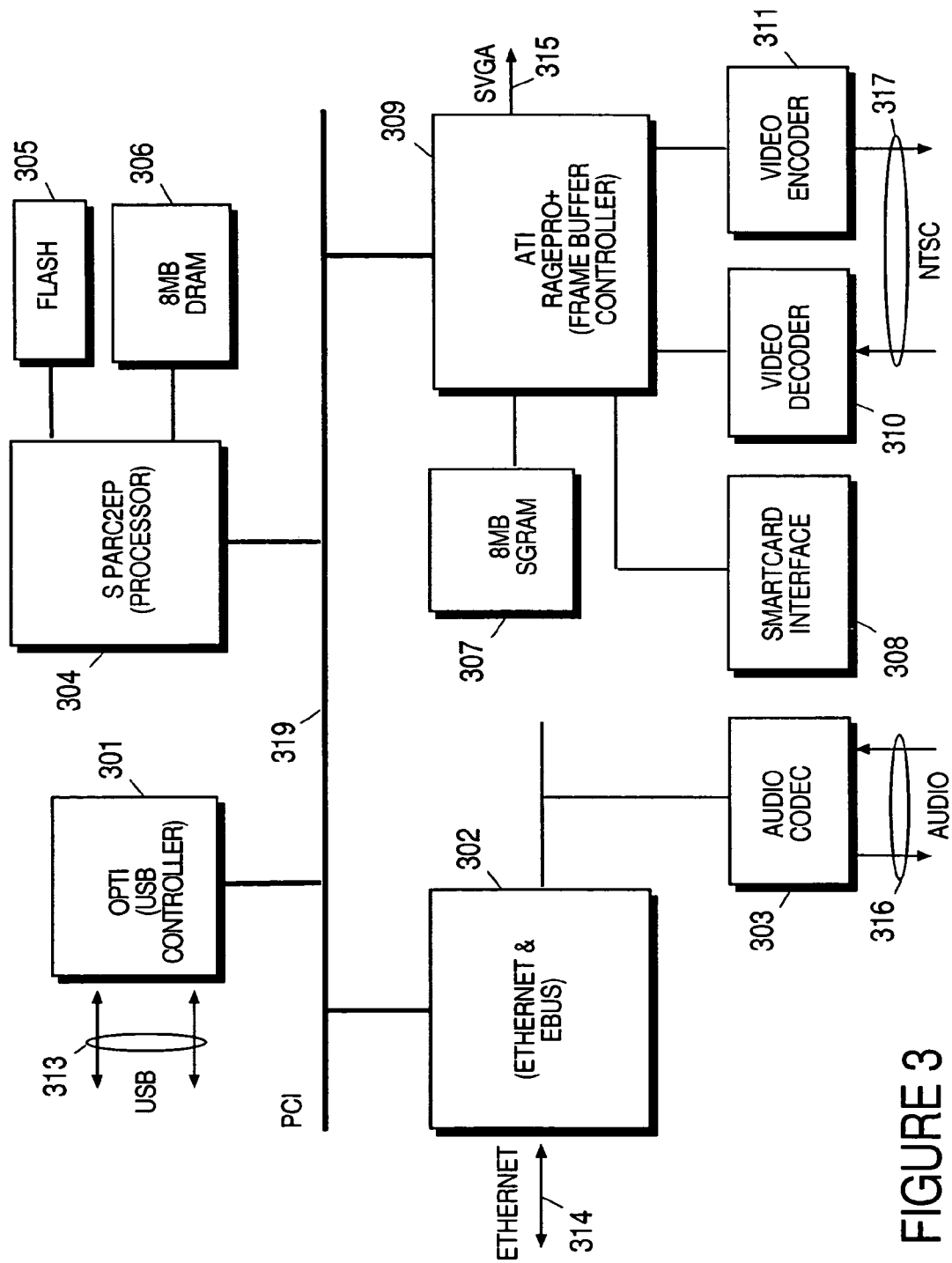
FIG. 3 is a block diagram of one embodiment of an DTU of the present invention.

A block diagram of a DTU is illustrated in FIG. 3. The components of the DTU are coupled internally to a PCI bus 319. A network controller 302 communicates to the interconnect fabric, such as an ethernet, through line 314. An audio codec 303 receives audio data on interface 316 and is coupled to network controller 302. USB data communication is provided on lines 313 to USB controller 301.

An embedded processor 304 may be, for example, a SPARC-2ep with coupled flash memory 305 and DRAM 306. The USB controller 301, network controller 302 and embedded processor 304 are all coupled to the PCI bus 319. Also coupled to the PCI bus 319 is the video controller 309 with associated SGRAM 307. The video controller 309 may be for example, an ATI RagePro+ frame buffer controller that provides SVGA output on line 315. Data is optionally provided in and out of the video controller through video decoder 310 and video encoder 311 respectively. This data may comprise digital or analog video signals (e.g., NTSC (National Television Systems Committee), PAL (Phase Alternate Line), etc.). A smart card interface 308 may also be coupled to the video controller 309.

Figure 4:
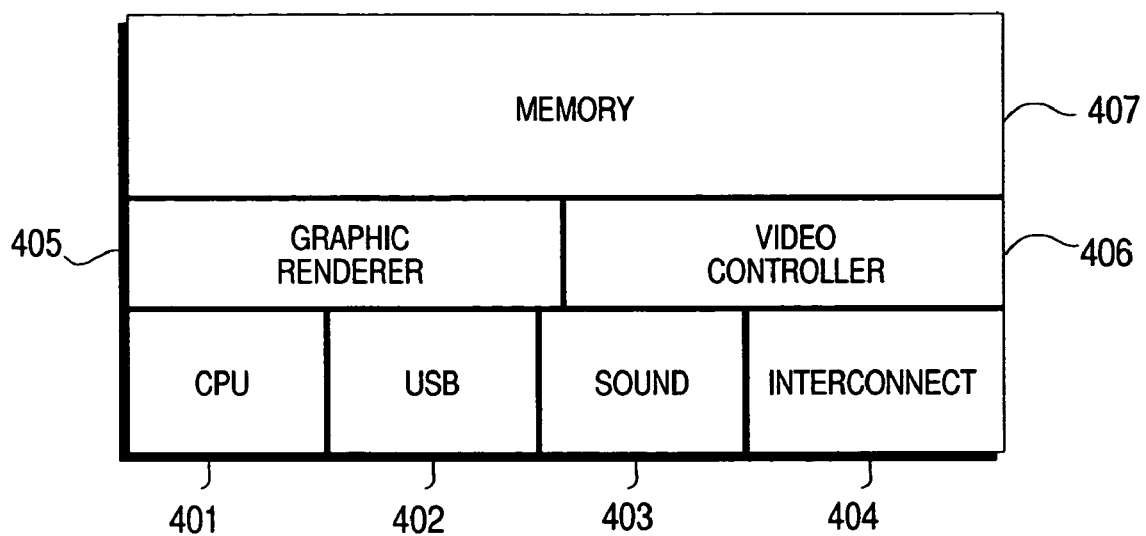
FIG. 4 illustrates a single chip DTU embodiment of the present invention.

Alternatively, the DTU can be implemented using a single chip solution as illustrated in FIG. 4. The single chip solution includes the necessary processing capability implemented via CPU 401 and graphics renderer 405. Chip memory 407 is provided, along with video controller/interface 406. A universal serial bus (USB) controller 402 is provided to permit communication to a mouse, keyboard and other local devices attached to the DTU. A sound controller 403 and interconnect interface 404 are also provided. The video interface shares memory 407 with the CPU 401 and graphics renderer 405. The software used in this embodiment may reside locally in non volatile memory or it can be loaded through the interconnect interface when the device is powered.

Operation of the Virtual Desktop System Architecture

Session Handling

The provision of services in the virtual desktop system architecture revolves around an abstraction referred to herein as a session. A session is a representation of those services which are executing on behalf of a user at any point in time. A new session is created when a new token is presented through the DTU to the authentication manager. A token is a unique identifier, which may be an ethernet address of a DTU (pseudo-token) or the serial number on a smart card.

The session abstraction is maintained by facilities known as the authentication and session managers, whose duty it is to maintain the database of mappings between tokens and sessions, and to manage the services which make up each session. For each token that the system is aware of the fact that there are one or more sessions. The session manager offers a service to the user or administrator that allows sessions to be configured and new sessions to be created.

A non pseudo-token session is not tied to any particular DTU. A token is associated with the user session, and the session can be displayed on any DTU where the user inserts his or her smart card. An software process known as the authentication manager is responsible for ensuring the legitimacy of a token and associating a token with its desired session. The DTU is typically in sleep, stand-by, or off mode when not in use. When a user wants to use a particular DTU, the user's access is validated in an authentication exchange that may comprise one or more of a smart card, key, password, biometric mechanism, or any other suitable authentication mechanism. The token extracted from this exchange is then used to establish a connection to the appropriate session When the authentication manager validates a token, it notifies the server's session manager, which in turn notifies all of the services within the selected session, and the session's display is composed at the server and transmitted to the user's desktop. From within a session, a user can interact with existing services, initiate new services, or kill off executing services. When the user departs from the DTU (e.g., by withdrawing a smart card) the authentication manager notes this and notifies the session manager, which in turn notifies all of its related services, which stop their display functions, and the DTU returns to its dormant state. The effect of the activation and deactivation of an DTU is similar to turning off the display monitor on a desktop system. The services of the user's session are still available and perhaps executing, but no display is generated. One advantage of the present invention is that the services available in a session can be accessed on any connected DTU.

Figure 5:
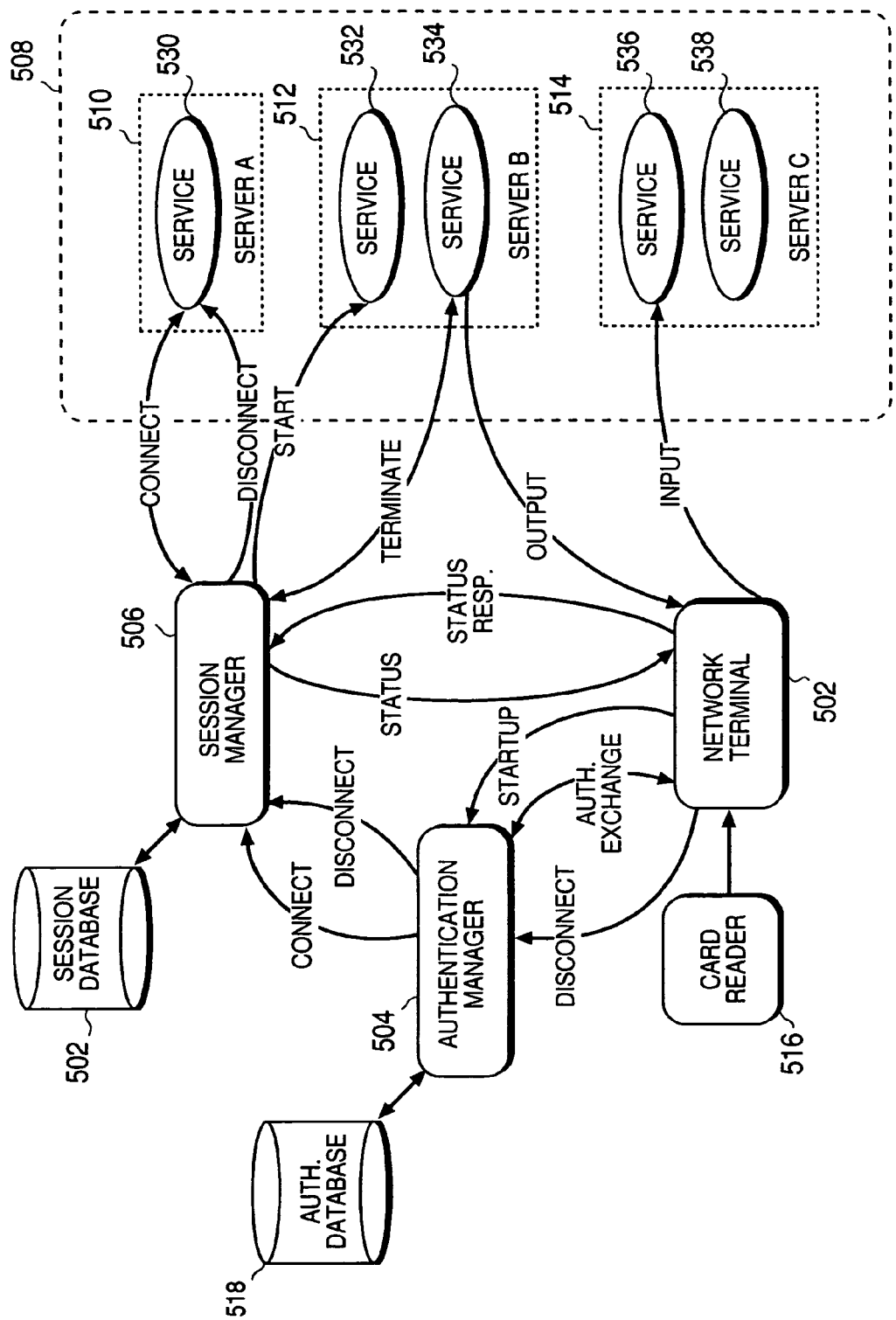
FIG. 5 illustrates an example of session management and authorization in the present invention.

FIG. 5 provides an example of session management and authorization in the present invention. This material is described in co-pending U.S. patent application Ser. No. 09/063,339, filed Apr. 20, 1998, entitled "Method and Apparatus for Session Management and User Authentication" and assigned to the present assignee, and incorporated herein by reference. Network terminal 502 is a DTU, having the task of displaying output of services to a user and obtaining input to services from the user. Network terminal 502 has the ability to respond to a command (e.g., display command) received from, for example, a software program (e.g., services 530-538, authentication manager 504 and session manager 506) executing on a computational service provider. The input received from a user is forwarded to, for example, a service that is fulfilling a user request.

A service is a program that performs some function for a user. More than one server can execute the services that comprise a session. For example, in session 508, service 530 is executing on server 510, services 532 and 534 are executing on server 512 and services 536 and 538 are executing on server 514.

A user accesses a system (e.g., a server, a session, a service and a network terminal) by initiating a login. During login, the user is validated by authentication manager 504. Various techniques can be used to allow the user to initiate a login. For example, the user can initiate a login by pressing a key on network terminal 502.

In one embodiment, a user accesses the system by inserting a smart card in a card reader (e.g., card reader 516) attached to network terminal 502. A smart card is a card that is capable of storing information such as in a magnetic strip or memory of the smart card. The smart card can store user information such as a user's identification (i.e., user ID such as a 64-bit number) and, optionally, a secret code (e.g., a 128-bit random number) that is transmitted to network terminal 502. The secret code may be used during authentication.

Network terminal 502 is aware of (or can obtain) its interconnection network address and the address of authentication manager 504. When a user initiates the login, network terminal 502 initiates communication with authentication manager 504 to begin authentication. Authentication manager 504 is a program active (e.g., executing) on a server connected to network terminal 502 via an interconnection network such as a local area network (LAN), for example. It should be apparent, however, that network terminal 502 can be connected to authentication manager 504 using other interconnection network technologies such as a fiber channel loop, point-to-point cables, or wireless technologies. Network terminal 502 sends a startup request to authentication manager 504 that includes a user identification (userID).

If the expected result is received from the user, authentication manager 504 notifies session manager 506 (via a connect message) that the user has logged into the system on network terminal 502. Session information contained in authentication database 518 is used to identify the server, port and session identifier (ID) for session manager 506. Session manager 506 is a program that is active on a computational service provider and is connected to authentication manager 504 and network terminal 502 via an interconnection network, for example. Authentication manager 504 sends a message to session manager 506 using session manager 506's server and port information contained in authentication database 518.

In response to the connect message from authentication manager 504, session manager 506 notifies the services in the user's current session (i.e., the services in session 508) that the user is attached to network terminal 502. That is, session manager 506 sends a connect message to services 530-538 to direct output to network terminal 502. Session manager 506 ensures that services that are considered to be required services of the session are executing. If not, session manager 506 causes them to be initiated. The user can interact with services 530-538 within a session (e.g., session 508). Network terminal 502 is connected to servers 510, 512 and 514 (and services 530-538) via an interconnection network such as a local area network or other interconnection technology. The user can also start new services or terminate existing services.

The user can quit using the system by removing the card from card reader 516. Other mechanisms to quit the system can also be used with the invention (e.g., a "sign-off" button on network terminal 502). Services 530-538 can continue to run even after the user removes the card from card reader 516. That is, a user's associated session(s) and the services that comprise a session can continue in existence during the period that a user is logged off the system. When the user removes the card from card reader 516, network terminal 502 notifies authentication manager 504 (e.g., via a disconnect message) which notifies session manager 506 (e.g., via a disconnect message). Session manager 506 notifies services 530-538 (e.g., via a disconnect message) which terminate their transmission of display commands to network terminal 502. Services 530-538 continue execution, however, during the time that the user is away from a network terminal. The user can log back in using a network terminal such as network terminal 502, to connect to session 508 and interact with services 530-538.

Operation of the Self-Discovery Mechanism

One embodiment of the present invention implements a protocol which uses a self-discovery mechanism. When a server fails, the DTU knows that the server has failed because it no longer receives timely messages from the server. Thereafter, the DTU begins a connection sequence in which it communicates, for example using DHCP, to obtain its location and the location of a potential server, which can be in the form of IP addresses. Once a server is found, the DTU can connect to this server.

If the connection fails, the DTU broadcasts messages (e.g., a "serverQ" message) to other servers. The other servers respond and a connection is established to one of the servers. Since the sole copy of permanent user data does not reside on either the failed server, or the target server for redirection, they are effectively interchangeable from the user's perspective. Once redirection occurs, access to data is possible on the new host for the user's session.

The Group Manager Process

Figure 6:
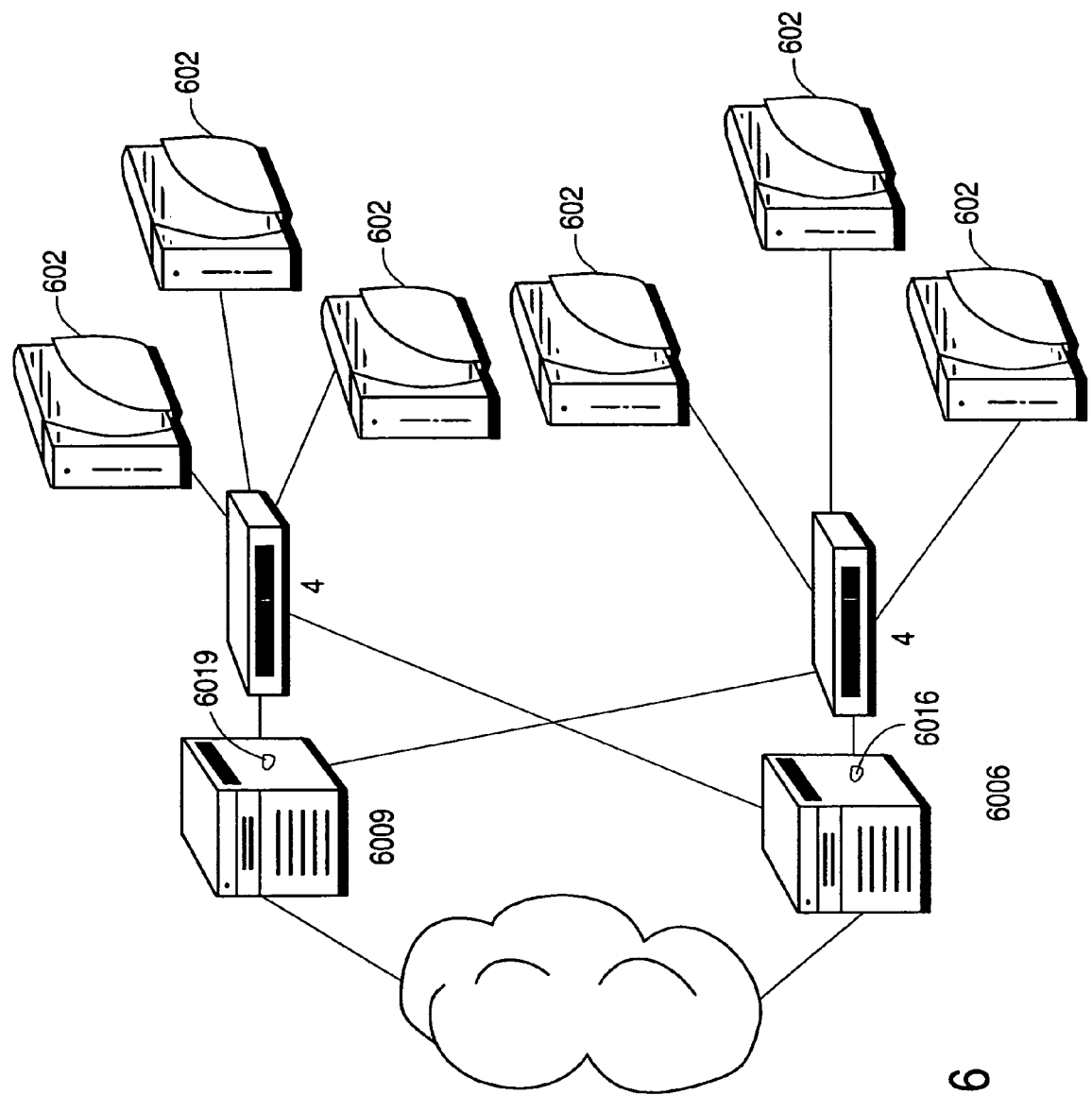
FIG. 6 illustrates the virtual desktop system architecture implementing the group manager process in accordance with the present invention.
Figure 7:
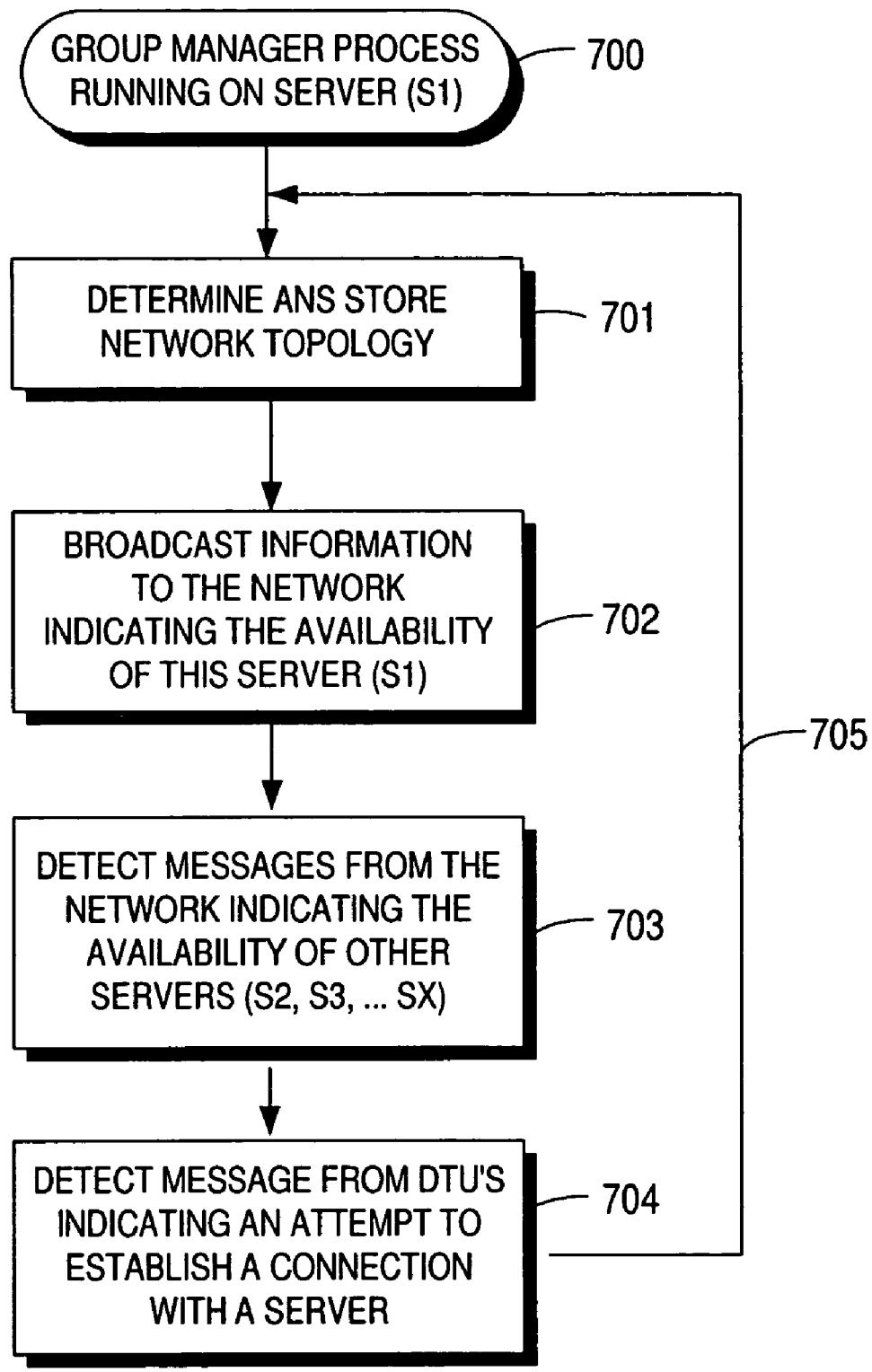
FIG. 7 is a flow control diagram of the steps performed by the group manager process in accordance with the present invention.

Each server runs a group manager process. Referring to FIG. 6, group manager processes 601a and 601b run on servers 600a and 600b and are connected over a computer network to DTUs 602. The group manager process operates in accordance with FIG. 7. The group manager process 700 gathers and stores a description of the network topology 701, which may be stored in a table. In one embodiment, the group manager 700 reads the network configuration of its server by looking to the kernel to see what network interfaces are connected to it. Periodically, the group manager process creates a packet by which it broadcasts this information 702 to the network indicating the availability of the server upon which the group manager process is running. In one embodiment, this broadcast of the packet occurs using the unreliable datagram protocol, wherein message broadcasting is a uni-directional communication.

Each group manager process listens in order to detect packets of information 703 from other group manager processes indicating the availability of other servers. With this information the group manager process constructs a table of other hosts heard from. This table represents the topology of the network. The group manager process additionally listens to messages on the network broadcast by DTUs attempting to establish a communication link to that server upon which the group manager process resides 704. This process repeats from time to time, as indicated by transition 705.

Figure 8:
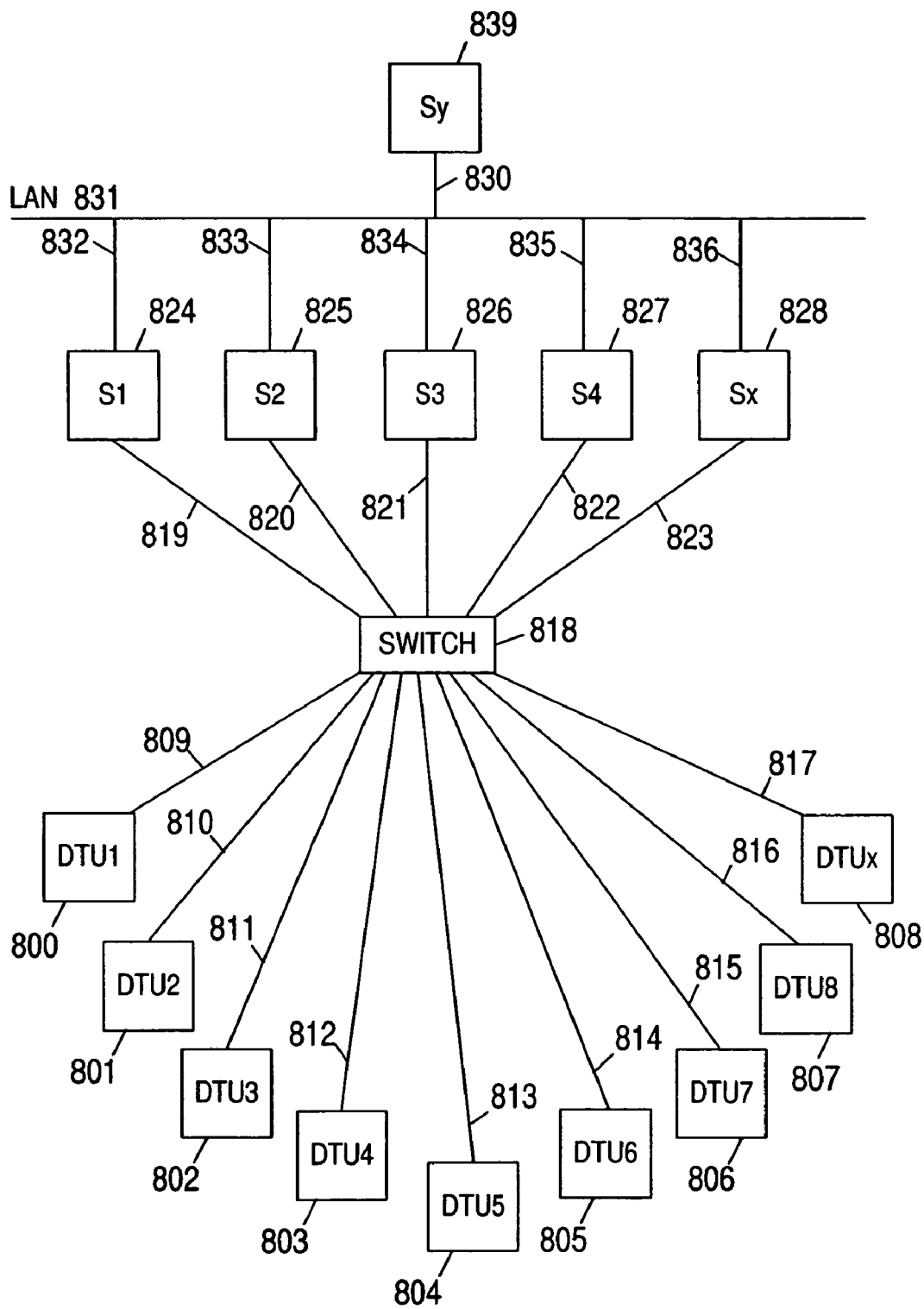
FIG. 8 is a pictorial representation of a possible network topology that may be maintained by a group manager process in accordance with the present invention.

FIG. 8 is a pictorial representation of a possible network topology description constructed by a group manager process. DTUs 1 through x, designated 800-808, connect via interconnect fabrics 809-817 to a switch 818. In turn, the switch 818 connects via interconnect fabrics 819-823 to session hosting servers s1 through sx, designated as 824-828. The servers themselves are interconnected by the fabric via switch 818 which allows for redirection. In addition, server sy 829 contains the permanent store of user data. In one embodiment, server sy 829 is connected via a separate LAN (local area network) or other network to session hosting servers s1-sx using network interfaces 830 and 832 through 836. By each group manager broadcasting its network information, every group manager in the network will have a complete view of the system.

In one embodiment, each group manager process sends a broadcast (or multicast) "host" message to the network ports indicating the configuration of all interfaces connected to the server. In this embodiment, the group manager processes on each server also listens to the ports for host messages from other servers in the group. With these messages, each group manager process constructs a list of servers and shared interfaces, including network-addressing information. This information is used to determine which DTUs can connect to which servers, when there are a multiplicity of network interfaces on the servers.

As an example, a host server named "mud" may broadcast the following host message on all interfaces every twenty seconds:

host=mud addr=81907f05 time=950739941 numifs=2 flags=4
   cpus=2 clock=248 interface=hme0 ip=81907f05
   mask=ffffff00 bcast=81907fff interface=ge0 ip=c0a88003
   mask=ffffff00 bcast=c0a880ff where "host" is the host name of a server (e.g., "mud"), "addr" is the primary network address of this host, "numifs" is the number of network interfaces on this host, "interface" is the name of a network interface on this host, "ip" is the IP address of the preceding interface, "mask" is the IP netmask of the preceding interface, and "bcast" is the IP broadcast address of the preceding interface. Additionally, each host message may be signed by the group manager process of the sending server, using a group manager secret known only to a trusted group of servers.

The network topology may be represented, for example, as a table of hosts (i.e., servers) and network information as illustrated in Table A below, which shows one server's group manager view of the network topology (values shown in hexadecimal). In addition to the definitions provided with respect to the host message above, the following definitions apply to Table A below: "lastseen" is the number of seconds since the last packet was received from the respective host (server); "timeoff" is the time difference between host05 (the first listed server) and the respective host; "TRUSTED" indicates that the respective host uses the same group manager secret to sign messages; and "lastpkt" is the time in seconds since a packet was received on the preceding interface (−1 indicates a packet has never been received on that interface).

TABLE A

Host host05 lastseen 4 timeoff 0 addr 8190a705 numifs 2 TRUSTED
interface ge0 ip c0a88001 mask ffffff00 bcast c0a880ff lastpkt 4
interface hme0 ip 8190a705 mask ffffff00 bcast 8190a7ff lastpkt 4
Host host22 lastseen 16 timeoff 25 addr 8190a716 numifs 3 TRUSTED
interface le0 ip 8190a716 mask ffffff00 bcast 8190a7ff lastpkt 16
interface qfe0 ip c0a88101 mask ffff0000 bcast c0a8ffff lastpkt −1
interface qfe1 ip c0a88201 mask ffff0000 bcast c0a8ffff lastpkt −1
Host host21 lastseen 15 timeoff 43 addr 8190a715 numifs 2 TRUSTED
interface hme0 ip 8190a715 mask ffffff00 bcast 8190a7ff lastpkt 15
interface hme1 ip c0a88001 mask ffff0000 bcast c0a8ffff lastpkt −1
Host mud lastseen 1 timeoff 39 addr 81907f05 numifs 2 TRUSTED
interface hme0 ip 81907f05 mask ffffff00 bcast 81907fff lastpkt −1
interface ge0 ip c0a88003 mask ffffff00 bcast c0a880ff lastpkt 1
Host host45 lastseen 18 timeoff 26 addr 8190a72d numifs 2 TRUSTED
interface hme0 ip 8190a72d mask ffffff00 bcast 8190a7ff lastpkt 18
interface hme1 ip c0a88001 mask ffffff00 bcast c0a880ff lastpkt −1
Host host41 lastseen 18 timeoff −81 addr 8190a729 numifs 2 TRUSTED
interface hme0 ip 8190a729 mask ffffff00 bcast 8190a7ff lastpkt 18
interface le0 ip c0a88001 mask ffffff00 bcast c0a880ff lastpkt −1

Each DTU is assigned a network address when it starts up. In one embodiment, this network address may be an IP address assigned using the Dynamic Host Configuration Protocol (DHCP). Given this IP address and the network information in Table A, a server can determine the subset of servers to which the DTU is able to connect. The server also uses this information to monitor which of the other servers are up and running. A server or interface may be declared "down" if the "lastseen" time for the host or the "lastpkt" time for an interface exceed a limit, e.g., sixty seconds.

The Self Discovery Protocol

Figure 9A:
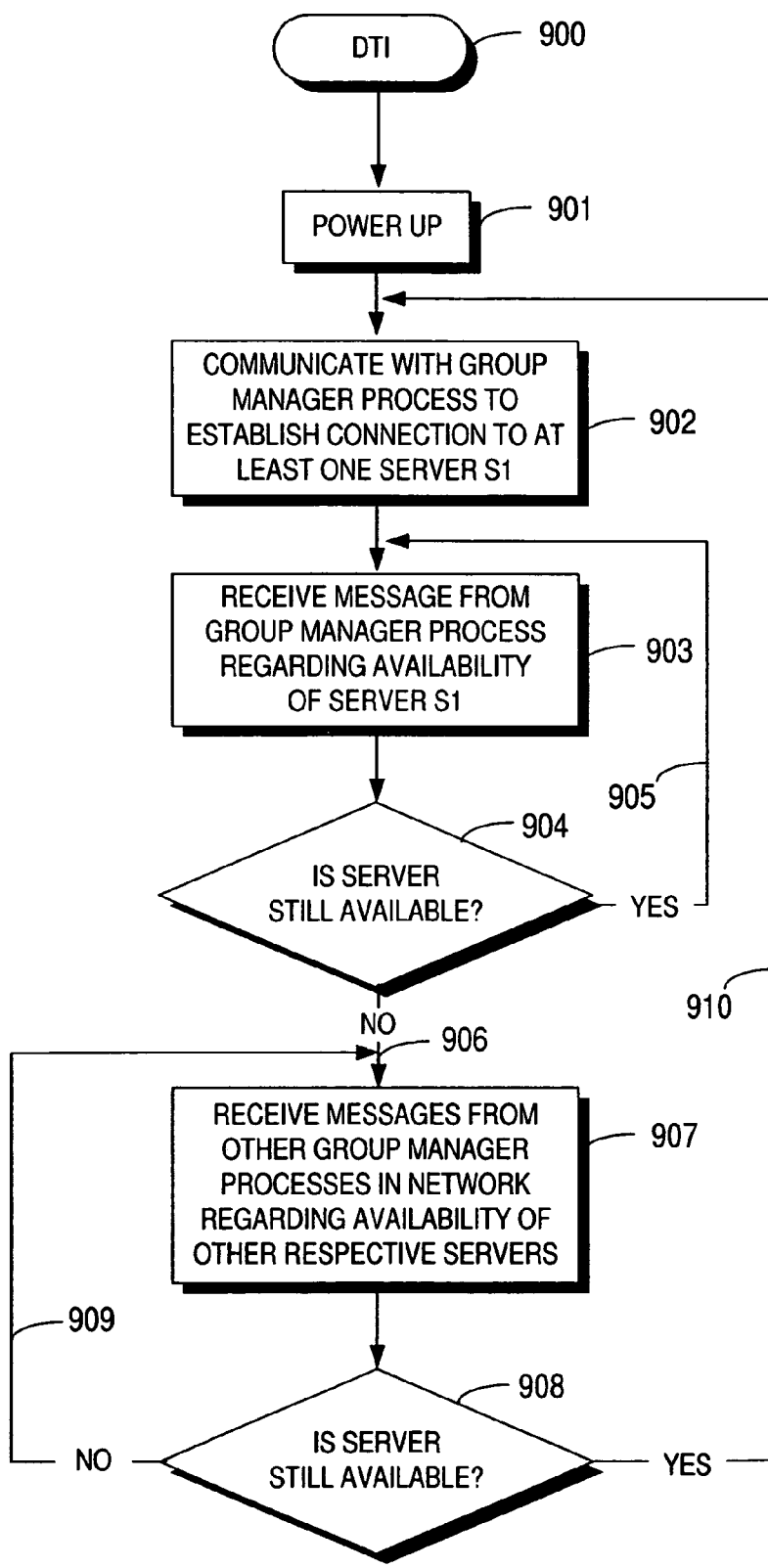
FIG. 9a is a flow control diagram of the steps performed by a DTU as it communicates with the network according to the protocol, in accordance with the present invention.

The DTU communicates with the network in the manner displayed in FIG. 9a. First, a user accesses DTU 900. For instance, the user may power up the DTU at this point 901. A given DTU always has a connection to at least one server in the network. This connection is established at step 901 where the user powers up the DTU. Upon power up, the DTU broadcasts messages using a protocol, which in one embodiment can be called to the kernel of the server, and received by the group manager process residing on the server where the connection is to be made 902.

Once a connection is established, the DTU 900 periodically receives messages from the group manager 903 regarding the availability of that server. If the server is available 904, flow proceeds along transition 905 and the DTU continues to listen to availability messages from the group manager. If after a certain time, no message is received, it is presumed that the server has crashed, and flow proceeds along transition 906.

Thereafter, the DTU begins to listen for messages from other group manager processes residing on other servers regarding their availability 907. The DTU decides if these servers are available 908. If they are not available, flow proceeds along transition 909 and the DTU continues to listen until they are. If they are available, flow proceeds along transition 910, the DTU establishes communications with the group manager process which resides upon the available server, and the process repeats with steps 902-910.

In one embodiment, if the server specified by the booting DTU does not respond, the DTU sends a broadcast "serverQ" message to be received by one or more other servers on the network. When another server receives the serverQ message, it responds with a serverR message to the requesting DTU, giving it network information. This information can include, for instance, the server's IP address on the subnet to which the DTU belongs. When serverR responses are received from one or more servers, the DTU attempts to connect to the responding servers until successful.

Figure 9B:
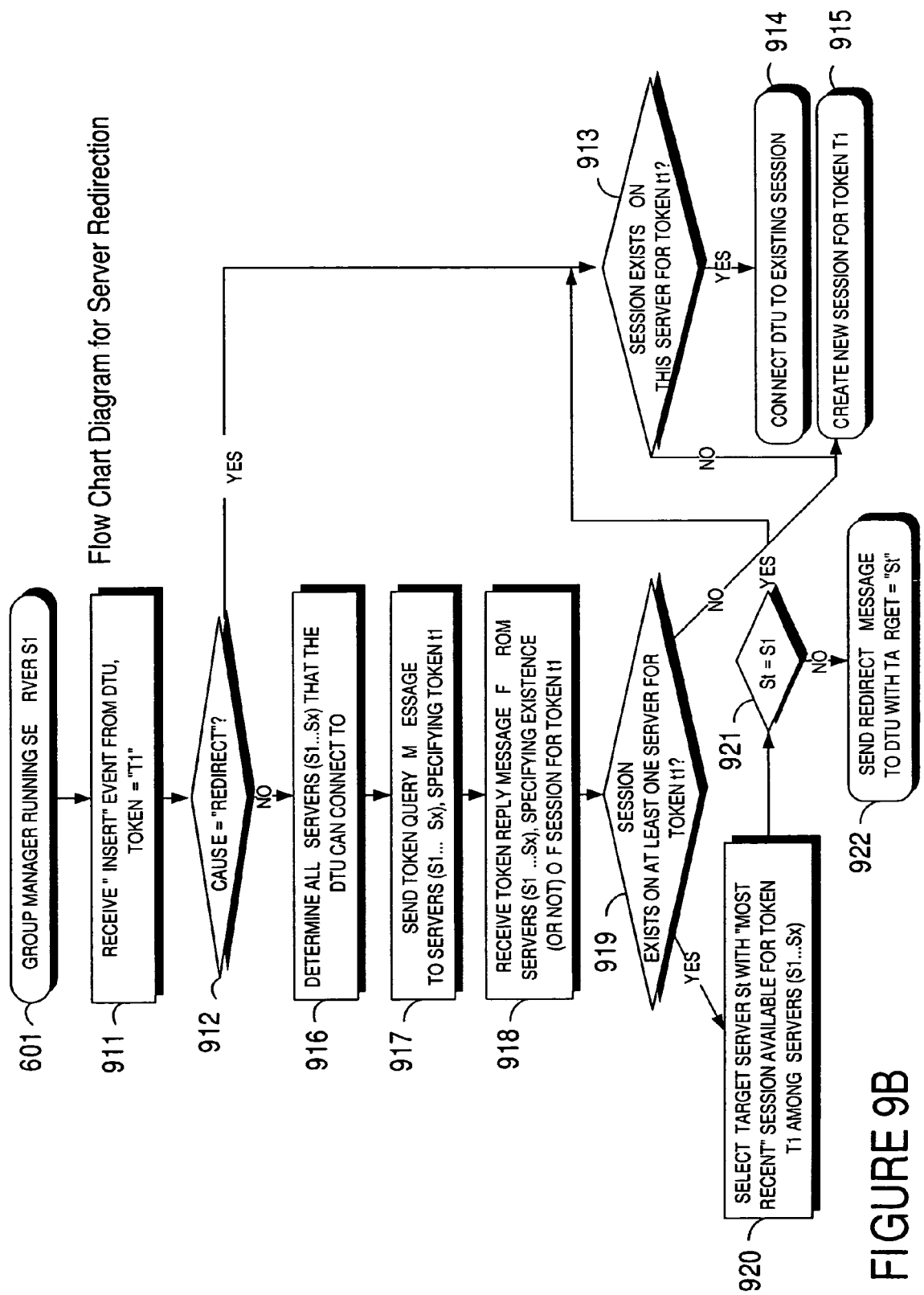
FIG. 9b is a flow control diagram of server redirection in accordance with the present invention.

The flow of the redirection process is shown in FIG. 9b. Group manager process 601 runs on server s1. A DTU attempts to initiate a session on the first available server, which receives its broadcast message, for instance on server s1 911 by sending an "insert" event with a token. The group manager process on server s1 then reads the packet to determine whether redirection has occurred 912. If so, the group manager determines whether a session exists on s1 for that token 913. If a session does exist, the DTU is connected to that session 914. If a session does not exist, a new session 915 is created.

If redirection has not occurred at step 912, the group manager process of server s1 determines other servers (s2, . . . , sx) that the DTU can connect to 916. Next, the servers that the DTU can connect to (s1 . . . sx) are sent messages by the group manager process of server s1, specifying the token from the DTU 917. Thereafter, the group manager process of server s1 receives responses 918 from servers (s1, . . . , sx), specifying the existence (or not) of a session for the given token. The group manager process determines whether a session exists on at least one server for the token 919. If a session does not exist, a new session is created on server s1 for the token 915. If a session does exist, the target server selected is the one with the most recent session available for the token 920. The group manager process then determines whether the target server is the current server 921. If the target server is not the current server, a redirect message is sent to the DTU 922, telling it to redirect to the target server st. If the target server is the current server, a transition to step 913 is made.

Figure 9C:
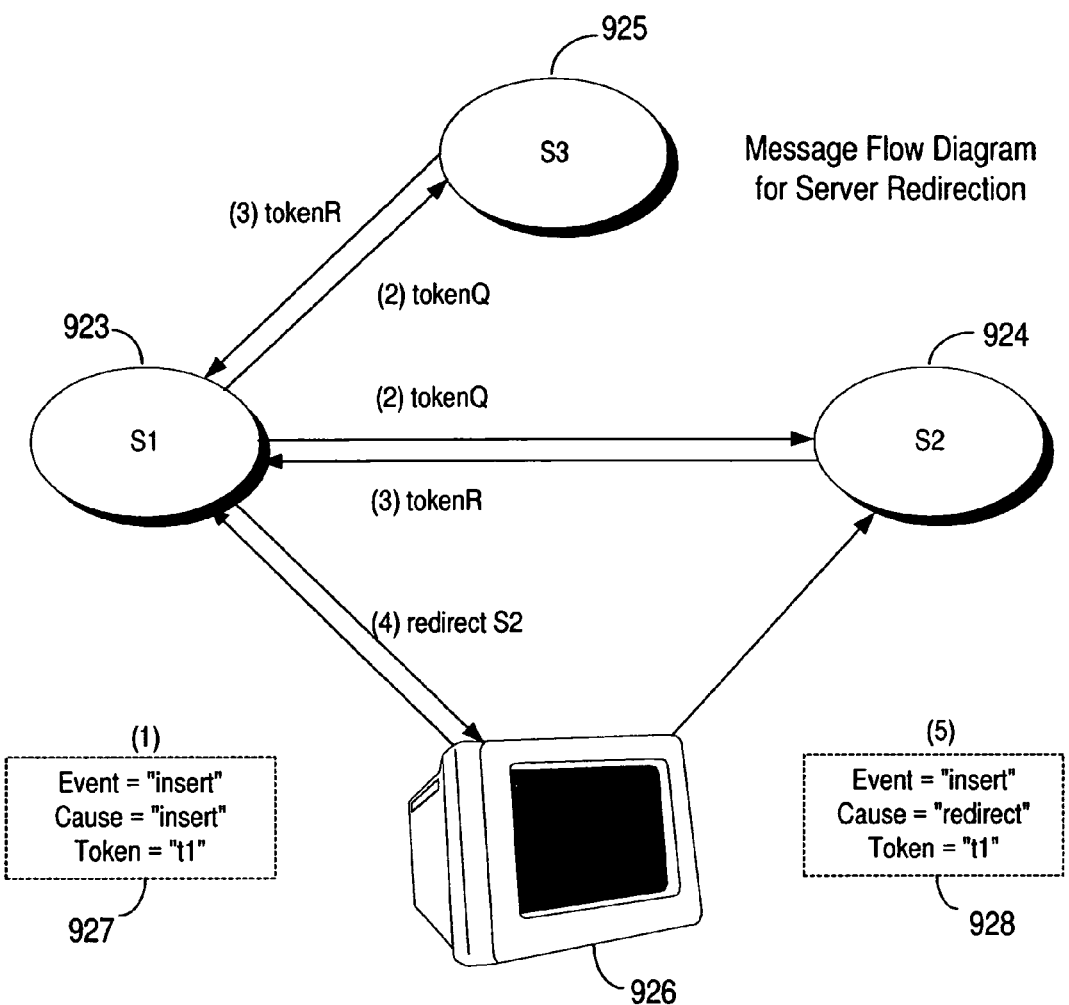
FIG. 9c is a message flow diagram of server redirection in accordance with the present invention.

FIG. 9c provides a message flow diagram for server redirection. Servers s1 923, s2 924, and s3 925 and DTU 926 pass messages. DTU 926 sends an insert event 927 (with cause="insert") to server 923. After passing tokenQ and tokenR messages, server 923 becomes aware of the fact that a session exists for token t1 on server 924. Server 923, therefore, sends a redirect message to DTU 926. Thereafter, DTU 926 sends an insert event 928 to server 924. Note that part of the message indicates that this is a redirect (i.e., cause="redirect"), thereby bypassing a repeated authentication attempt.

After collecting tokenR responses from the candidate servers, in one embodiment, the group manager process on the server that originally received the insert event (server 923) chooses a server to which to forward the DTU by choosing the session with the latest time of last connection. The group manager then sends a redirect message to the DTU, telling it to reconnect to the new server. The DTU breaks the connection with the current server, reconnects to the new server, and sends an insert event with a cause field of "redirect." The "redirect" cause prevents the new server from doing the server selection all over again. The DTU is connected to the session identified by the token.

As a security measure, one embodiment signs messages broadcast throughout the network. For example, one embodiment may use a keyed SHA1 hash algorithm. The key is derived from a local key file on each server, which must be identical on all of the servers for the servers to trust each other. Host messages are always accepted. Only messages with the correct signature are accepted as "TRUSTED" hosts. TokenQ and tokenR messages are only exchanged among TRUSTED hosts in this embodiment.

In one embodiment, when a server fails, the DTU detects the failure when it does not receive timely responses to a "keep alive" message. Upon failure to receive a response to the "keep alive" message, the DTU sends messages to a new server using the serverQ/serverR protocol previously described. Thus, when a server fails, the protocol allows for a reconnection of all DTUs to an active server. The failed over session can resume on the new server and make use of the permanent user data coupled to all host servers in the group.

Thus, a method and apparatus for making a computational service highly available in a multiple server computer environment has been provided in conjunction with one or more specific embodiments. The invention is defined by the claims and their full scope of equivalents.

We claim:

1. A method of making a computational service available in a multiple server computing environment comprising:
   exchanging information between a plurality of servers;
   initiating a connection between a client unit and a first server of said plurality of servers;
   determining a most recently accessed session of a plurality of sessions on said plurality of servers;
   determining at said first server a location of said most recently accessed session on one of said plurality of servers; and
   redirecting said client unit via said first server to a second server of said plurality of servers having said most recently accessed session;
   wherein each of said plurality of sessions comprises a plurality of services requested by said client unit;
   wherein said first and second servers can each provide said plurality of services;
   wherein said plurality of services comprise state maintenances for a user of said client unit;
   wherein redirecting is executed when said first server fails to respond to said client unit with a message, the message indicating availability of said first server, and said redirecting of said client unit to said second server maintains access to said accessed session while continuing said plurality of services to said client unit so as to eliminate a single point failure.

2. The method of claim 1, wherein said initiating comprises:
   said client unit broadcasting a message to said plurality of servers; and said first server responding to said message.

3. The method of claim 1, wherein said initiating is in response to a prior server failing.

4. The method of claim 1, wherein said most recently accessed session is associated with a token.

5. The method of claim 4, wherein said determining at said first server, the location of said most recently accessed session on one of said plurality of servers, further comprises:
   said first server sending a message to said plurality of servers, said message comprising said token; and
   said plurality of servers responding to said first server with session information associated with said token.

6. The method of claim 1, further comprising securing messages between said client unit and said plurality of servers.

7. The method of claim 6, wherein said securing is performed with a keyed hash signature.

8. The method of claim 1, wherein said information exchanged between said plurality of servers comprises a description of a network topology of said plurality of servers.

9. The method of claim 8, further comprising updating status in said network topology on a relationship between a connectivity of said client unit and said second server.

10. The method of claim 1, wherein said second server comprises a server available for having said session.

11. The method of claim 1, wherein said client unit comprises a thin client unit.

12. The method of claim 1, wherein said session comprises a thin client session.

13. The method of claim 1, comprising: maintaining said session persistently by said plurality of servers.

14. The method of claim 1, wherein said client unit comprises a stateless device.

15. The method of claim 1, wherein said determining said location at said first server of said session on one of said plurality of servers comprises receiving a message from said second server of an availability of said second server for having said session.

16. The method of claim 15, wherein said token can identify a plurality of sessions.

17. The method of claim 1, wherein said plurality of servers communicate with each other in a self-organizing manner.

18. The method of claim 17, wherein said plurality of servers are capable of providing services and sessions so as to provide server redundancy, and so as to eliminate a master component and the single point failure.

19. A method of making a computational service available in a multiple server computing environment comprising:
    exchanging information between a plurality of servers via a self-discovery mechanism;
    initiating a connection between a client unit and anyone of said plurality of servers that is available to connect with said client unit by inserting a token into said client unit;
    finding a plurality of sessions associated with said token;
    determining a most recently accessed session;
    directing said client unit to a first server of said plurality of servers having said most recently accessed session; and
    redirecting said client unit via said first server to a second server of said plurality of servers having a next most recently accessed session if said first server fails, wherein redirecting of said client unit to said second server maintains access to said accessed session while continuing said computational service to said client unit so as to eliminate a single point failure.

* * * * *